(12) United States Patent
Wardman et al.

(10) Patent No.: US 7,290,931 B2
(45) Date of Patent: Nov. 6, 2007

(54) VACUUM PRE-LOADED PNEUMATIC BEARING WITH ONBOARD VACUUM GENERATOR

(75) Inventors: Geoffrey B. Wardman, Milford, CT (US); Santiago E. del Puerto, Milton, NY (US)

(73) Assignee: ASML Holding N.V. (NL)

( * ) Notice: Subject to any disclaimer, the term of this patent is extended or adjusted under 35 U.S.C. 154(b) by 116 days.

(21) Appl. No.: 11/182,193

(22) Filed: Jul. 15, 2005

(65) Prior Publication Data

US 2007/0014494 A1   Jan. 18, 2007

(51) Int. Cl.
*F16C 32/06* (2006.01)
(52) U.S. Cl. ........................................ 384/12
(58) Field of Classification Search .................. 384/12, 384/7, 114, 121, 123
See application file for complete search history.

(56) References Cited

U.S. PATENT DOCUMENTS 5,839,324 A * 11/1998 Hara ............................ 384/12

2004/0161179 A1 * 8/2004 Zywno ......................... 384/12
2005/0129339 A1 * 6/2005 Sai et al. ....................... 384/12

* cited by examiner

*Primary Examiner*—Lenard A. Footland
(74) *Attorney, Agent, or Firm*—Sterne, Kessler, Goldstein & Fox PLLC

(57) ABSTRACT

A pneumatic bearing for supporting a payload is disclosed. The pneumatic bearing comprises a bearing body having an active surface divided into a lift portion and a pre-load portion. A plurality of gas distribution channels are formed in the bearing body, wherein a first channel receives a compressed gas, a second channel supplies a vacuum to the pre-load portion of the active surface, and a third channel supplies a positive pressure gas to the lift portion of the active surface. The bearing body has an integral, pneumatically powered, vacuum generator having an inlet coupled to the first channel, a vacuum aperture coupled to the second channel, and an exhaust. The compressed gas may be supplied to the lift portion of the active surface either in parallel, in series, or in a series-parallel configuration, with the integrated vacuum generator. In an embodiment, the pneumatic bearing is reconfigurable.

19 Claims, 22 Drawing Sheets

VACUUM PRE-LOADED PNEUMATIC BEARING WITH ONBOARD VACUUM GENERATOR

BACKGROUND OF THE INVENTION

1. Field of the Invention

The present invention relates to preloaded pneumatic air bearings.

2. Background

A bearing is a device that reduces friction between moving parts, or supports moving loads. There are two main types of bearings. The anti-friction bearing minimizes friction using devices such as roller bearings or ball bearings. The friction or sliding bearing, on the other hand, minimizes friction using active lubrication or other means to facilitate motion between moving parts. Many bearing assemblies take advantage of both principles—e.g., a lubricated ball bearing assembly.

A pneumatic bearing is an example of a friction or sliding bearing. It uses compressed gas to create a consistent gas film upon which the bearing rests and moves. The gas film acts as a virtually frictionless lubricant that facilitates smooth motion between the pneumatic bearing and the surface upon which it rests. The bearing surface upon which the lubricating gas film is generated is called the "active surface." Typically, pneumatic bearings require at least a steady source of compressed gas to maintain the lubricating gas film. Additionally, pneumatic bearings are often "preloaded" to provide stiffness. A pre-load force opposes the lift force generated by the lubricating gas film. Stiffness is a measure of how much additional force, applied in a direction normal to the active surface, would be required to change the thickness of the lubricating gas film by a certain amount. A pre-load may be provided by gravity with, for example, weights. A pre-load may also be provided with magnetic force, or may be generated by oppositely positioned active surfaces. A significant preload force is sometimes required depending upon the required degree of stabilization and stiffness.

An exemplary environment for pneumatic bearings is in the semi-conductor lithography field. There, pneumatic bearings provide a number of advantages. Pneumatic bearings are virtually frictionless, and therefore produce no particulate wear materials as they operate. Such particulate matter would be troublesome in the ultra-clean semiconductor manufacturing environment. Additionally, lubricants present in ball or roller bearings could outgas contaminant molecules, which are also detrimental in semiconductor manufacturing environments. Pneumatic bearings also require relatively little maintenance or regular repair. Finally, properly preloaded pneumatic bearings provide sufficient stiffness for the precise tolerances required in the scanning stages of semiconductor lithography tools.

Stiffness measured in the direction parallel to the active surface—i.e., "in-plane" stiffness—is ideally zero. The lower the actual in-plane stiffness, the better the air bearing is able to isolate its payload from in-plane base vibrations. Because the air film itself cannot support a shear load, it intrinsically has zero in-plane stiffness. All in-plane stiffness is therefore "parasitic" stiffness caused by external connections to the bearing such as the bending stiffness of gas hoses feeding the bearing. Parasitic stiffness is detrimental to the bearing's ability to isolate its payload from in-plane base vibrations. One way to mitigate parasitic stiffness is to reduce the number of external connections to the pneumatic bearing.

Stiffness measured in the direction perpendicular to the active surface—i.e., "out-of-plane" stiffness—is ideally very high. Out-of-plane vibrations are transmitted to the payload directly through the air film stiffness. Therefore, air bearings cannot completely isolate the payload from out-of-plane vibrations. One way to mitigate out-of-plane vibration is to make the air film sufficiently stiff so that the resonant frequency of the pneumatic bearing payload system is much higher than the excitation frequency of the out-of-plane vibrations. If this characteristic is achieved, the system response does not become amplified by resonance. In the context of semiconductor lithography tools, a typical out-of-plane stiffness may be on the order of millions of pounds per inch.

As noted above, one drawback to pneumatic bearings used in semiconductor lithography tool context are the number of physical connections required for practical operation. A pneumatic bearing requires at least a source of compressed air. Additionally, in the semiconductor lithography tool field, pneumatic bearings often support and carry wafers, reticles, and other payloads whose dynamic positioning in all four dimensions (x, y, z, time) must be precisely controlled. Such control requires precise positioning means for the pneumatic bearing. Thus, the pneumatic bearing will often be required to support numerous physical connections, either directly, or by virtue of physical connections to the pneumatic bearing payload.

For example, if pre-loading is accomplished with electromagnets, wires will be required to supply electricity. If pre-loading is accomplished using a counteracting vacuum on the active surface, then an additional connection would be necessary to connect to a vacuum source. Additionally, the bearings may also contain positioning aids such as interferometers, which may also require a physical connection to the pneumatic bearing. As the number of physical connections to the pneumatic bearing grows, so does unwanted drag, vibration and parasitic stiffness on the bearing.

Improvements in pneumatic bearing design are constantly needed. This is especially true in the semiconductor lithography tool arts, where manufacturing tools are being constantly pushed to more precise tolerances and faster speeds.

BRIEF DESCRIPTION OF THE DRAWINGS/FIGURES

The accompanying drawings, which are incorporated herein and form part of the specification, illustrate the present invention. Together with the description, they further serve to explain the principles of the invention and to enable a person skilled in the relevant art(s) to make and use the invention. In the drawings, like reference numbers indicate identical or functionally similar elements. Additionally, in most drawings, the leftmost digit of a reference number identifies the drawing in which the reference number first appears.

Figure 1A:
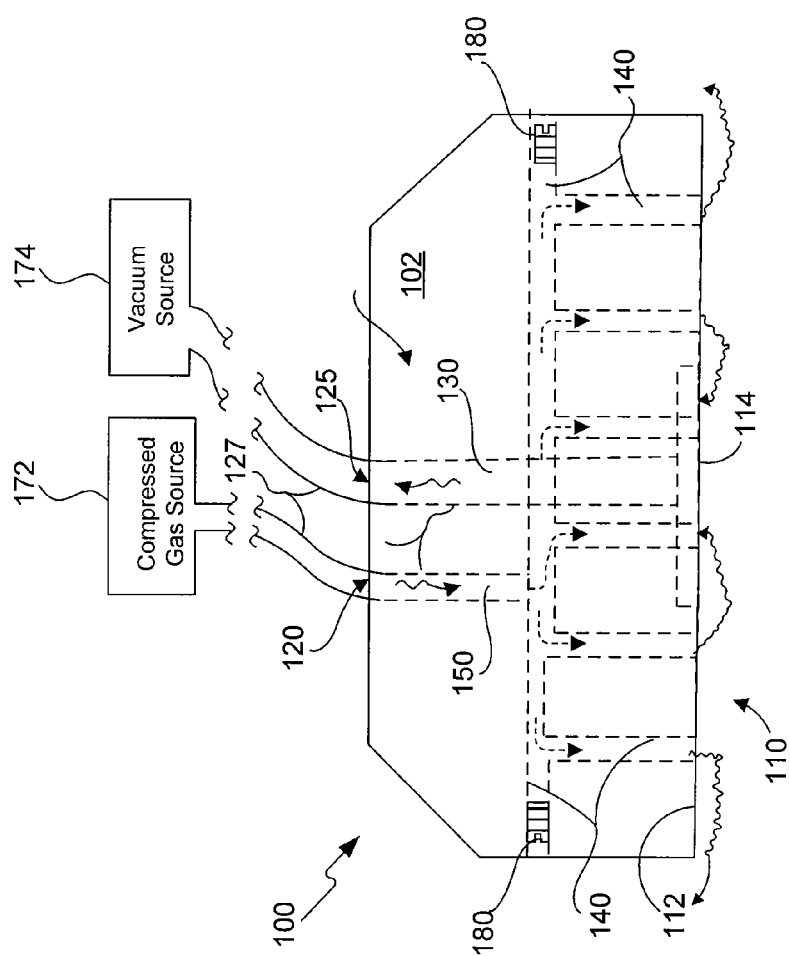
FIGS. 1A and 1B depict a state of the art pneumatic bearing.

The present invention will now be described with reference to the accompanying drawings.

DETAILED DESCRIPTION OF THE INVENTION

Overview

This overview is provided in the context of the semiconductor lithography arts. This environment was chosen to best illustrate certain features of the present invention. The environment, however, should not be construed as limiting the invention beyond those features recited in the appended claims. One of skill in the art could, of course, envision numerous uses for a pneumatic bearing having the features described herein, outside the semiconductor lithography tool context.

As noted above, pneumatic bearings often require a significant preload to achieve desired stability and out-of-plane stiffness. Additionally, in the context of semiconductor lithography tools, pneumatic bearings often have a significant number of external connections that increase drag and result in parasitic in-plane stiffness and vibration transmission to the bearing. Multiple connections also provide additional potential failure points. The inventors recognized a way to achieve sufficient preloading characteristics while simultaneously reducing the number of external connections to the pneumatic bearing. More specifically, the inventors integrated a pneumatically powered vacuum generator with a pneumatic bearing. The pneumatically powered vacuum generator provides the pre-loading force on the active surface. With the means for pre-loading the pneumatic bearing as an integral part of the bearing itself, at least one potential external connection (e.g., the vacuum source or other pre-load mechanism) and its attendant drag and vibration may be eliminated.

In the semiconductor lithography tool context, such a pneumatic bearing may be fabricated from aluminum, steel or other similar material, and would typically have hardened surfaces. As is known in the art, the bearing design may also substitute a porous block of carbon, silicon carbide, sintered powder metal or other porous material with a very large number of pores for the air to flow into the air film, instead of a using a solid material with a small number of discrete internal channels and orifices. Such bearings are available from New Way® Air Bearings, 50 McDonald Blvd Aston, Pa., 19014. The pneumatic bearing may be machined, cast, or a combination of both. The weight of the pneumatic bearing is a factor to be considered as well because, in the semiconductor lithography tool arts, pneumatic bearings used in the photolithography scanning stages typically experience large accelerations (e.g., 4 g's or more) in order to achieve scanning speeds of 2 m/sec or more within a short length of travel. Higher scanning speed results in higher product throughput, which results in lower overall chip production cost.

A vacuum preloaded pneumatic bearing will be described first, followed by several embodiments of a vacuum preloaded pneumatic bearing with an integrated, pneumatically powered vacuum generator. As will become clear, there are a number of ways in which a vacuum generator may be integrated with a pneumatic bearing. Additionally, such a pneumatic bearing may be configured in a number of different ways.

The embodiments described, and references in the specification to "one embodiment," "an embodiment," "an example embodiment," etc., indicate that the embodiments described may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to effect such feature, structure, or characteristic in connection with other embodiments, whether or not explicitly described.

Vacuum Preloaded Pneumatic Bearing

Figure 1B:
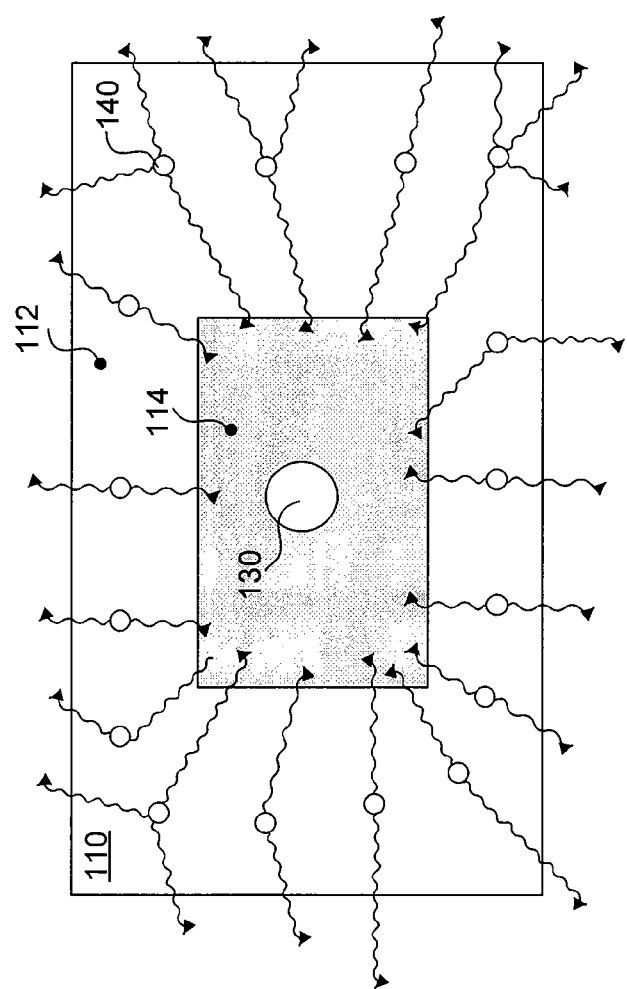

FIGS. 1A and 1B describe a vacuum preloaded pneumatic bearing 100. Pneumatic bearing 100 has a bearing body 102 with a compressed gas inlet 120, and an aperture 125 for connecting a vacuum source 174. Pneumatic bearing 100 also has an active surface 110 upon which a gas film is maintained. As illustrated in FIG. 1B, active surface 110 is split into a lift portion 112 and a pre-load portion 114.

Within bearing body 102 are a set of gas channels (indicated by dashed lines). A first gas channel 150 receives compressed gas through a compressed gas inlet 120. Compressed gas may be provided by a flexible hose 127 (e.g., a polyurethane hose) or other similarly flexible manifold that allows the pneumatic bearing to move. A second gas channel 130 supplies a vacuum to the pre-load portion 114 of active surface 110. A third set of gas channels 140 disperses the compressed gas to the lift portion 112 of active surface 110. Because the gas channels 130, 140 and 150 are plumbed, drilled, or otherwise formed in bearing body 102, there may be additional apertures in bearing body 102 as a result of the manufacturing process. Plugs 180 are, therefore, provided to seal any such apertures and confine the compressed gas or vacuum within bearing body 102.

It should be noted that the configuration of the above described gas channels is exemplary. One of skill in the art could envision alternate configurations depending on the environment in which the pneumatic bearing is used, the type of bearing body selected, or the desired operating characteristics thereof. For example, if a porous medium such as foamed silicon carbide were used, then the illustrated discrete channels would give way to a continuum of evenly distributed, much smaller channels.

FIGS. 1A-B illustrates the operation of the vacuum pre-loaded pneumatic bearing. When a compressed gas source 172 and a vacuum source 174 are operatively coupled to pneumatic bearing 100, a thin film of gas (indicated by meandering lines) is established over the active surface 110 creating a nearly frictionless film on which pneumatic bearing 100 rides. The compressed gas continually moves over lift portion 112 of active surface 100, and exhausts either to the outside edge of bearing body 102, or is drawn through pre-load portion 114 and through second gas channel 130, to which the vacuum has been supplied. In pneumatic bearing 100, the compressed gas and vacuum are supplied via flexible hoses 127 from sources (172, 174) external to, and separate from, pneumatic bearing 100.

The configuration of active surface 110 is merely exemplary. For example, one of skill in the art could configure the apertures through which the gas is supplied to the active surface 110 in a variety of ways, depending on the desired lift profile of the bearing. Furthermore, if the lift portion 112 of the active surface were comprised of a porous media such as foamed silicon carbide, then the discrete apertures would give way to a continuum of small apertures that are evenly dispersed over the lift portion 112 of the active surface 110.

Vacuum Generator

Figure 2:
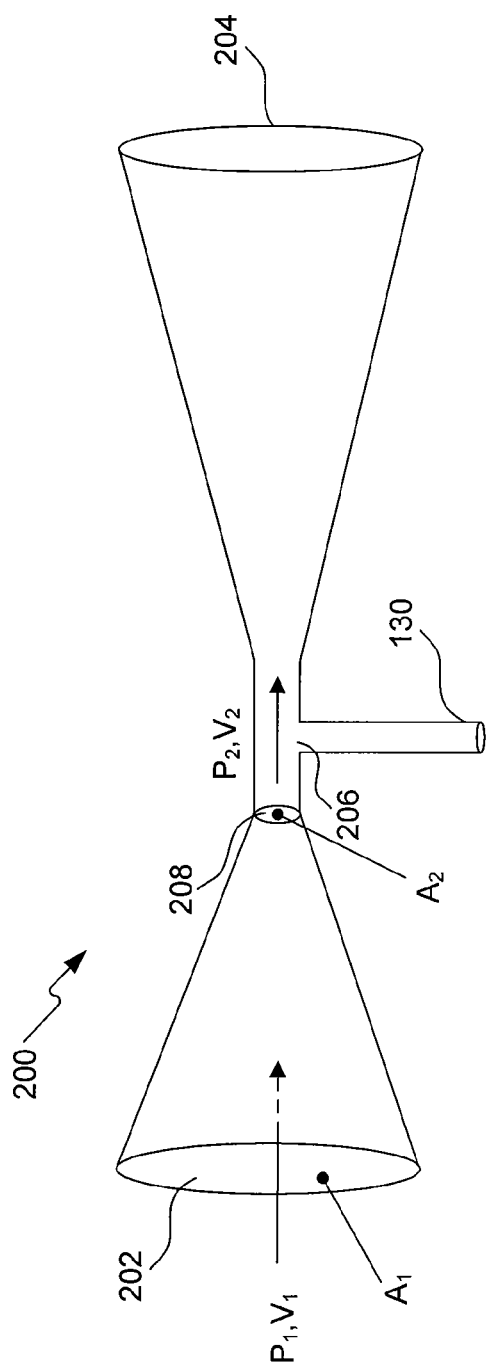
FIG. 2 depicts a vacuum generator.

FIG. 2 illustrates a vacuum generator 200. Vacuum generator 200 is a pneumatically powered Venturi nozzle. Compressed gas enters vacuum generator 200 at inlet 202 having an area $A_1$, with an initial pressure $P_1$ and velocity $V_1$. As the compressed gas enters the throat of the Venturi nozzle 208, the gas velocity $V_2$ increases due to the smaller cross sectional area $A_2$. According to Bernoulli's well known fluid dynamics equations, the pressure of a gas decreases as a result of increased flow velocity. The dropping pressure causes a vacuum to be formed at vacuum aperture 206. After leaving the throat 208 of Venturi nozzle 200, the compressed gas enters a diverging exhaust 204 portion of Venturi nozzle 200, which has larger cross section than the throat 208. Because of frictional losses inherent in the gas expansion (which is a thermodynamically irreversible process), even though the flow velocity is reduced, the pressure $P_2$ does not increase back to the initial pressure $P_1$ at the inlet. The compressed gas, which is now at a lower pressure, proceeds to a vacuum generator exhaust 204, along with any gas drawn through vacuum aperture 206 as a result of the generated vacuum. As described below, such a vacuum generator 200 may be integrated with a vacuum preloaded pneumatic bearing 100.

The type of gas used to power vacuum generator 200 may vary, depending on the needs of the system or the environment in which the pneumatic bearing is used. For example, the gas may be ordinary air if the environment in which the pneumatic bearing operates is insensitive to the composite gases in air. However, in chemically, optically, or temperature sensitive environments, such as semiconductor photolithography, the gas may be selected so as to not interfere with sensitive manufacturing processes. For example, nitrogen gas can be used.

Figure 3A:
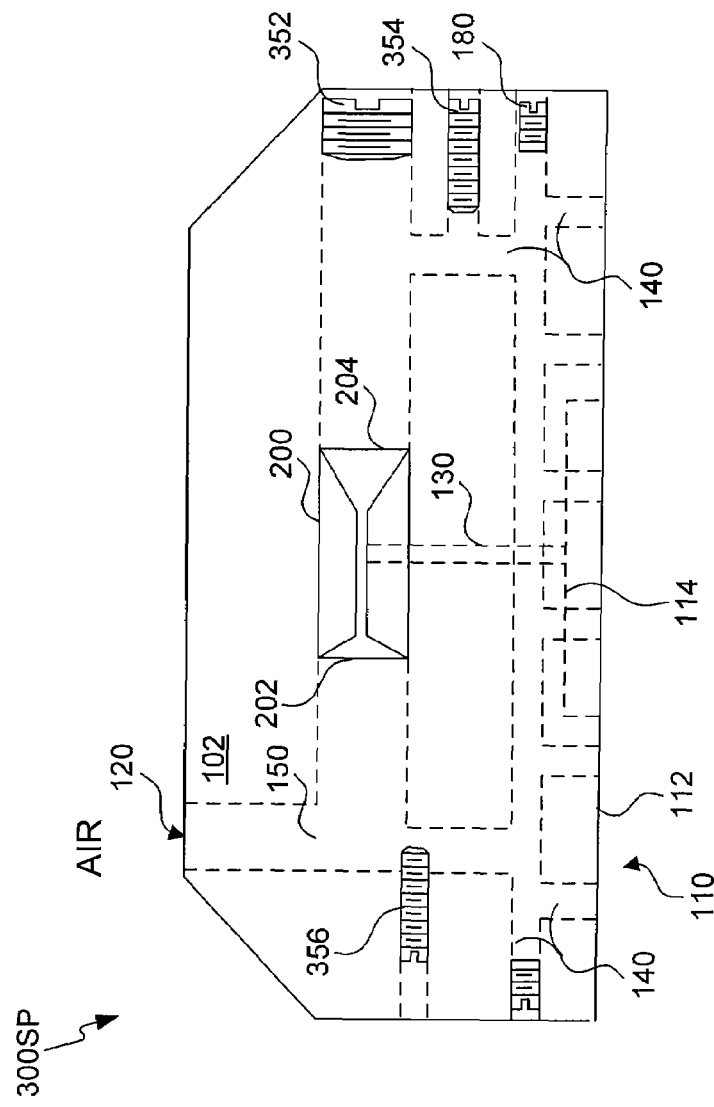
FIGS. 3A and 3B depict a generic embodiment of a pneumatic bearing with an integral vacuum generator, in a series-parallel configuration.

Reconfigurable Vacuum Preloaded Pneumatic Bearing with Integrated Vacuum Generator FIGS. 3A-F illustrate a reconfigurable vacuum preloaded pneumatic bearing with an integrated, pneumatically powered vacuum generator 200. As seen in FIG. 3A, for example, pneumatically powered vacuum generator 200 is disposed within bearing body 102, and is an integral part thereof. However, the vacuum generator 200 need not be plumbed into the bearing body 102 to be considered an integral part of the pneumatic bearing. For example, FIGS. 5A-F illustrate an integrated vacuum generator 200 that is disposed on bearing body 102. Moreover, multiple vacuum generators could be integrated into a single bearing body.

A number of gas flow restrictors (e.g., set screws, plugs (removable or otherwise), seals, or the like) allow the vacuum preloaded pneumatic bearing of FIGS. 3A-F to be changed between various configurations described below. More specifically, high pressure flow restrictor 356 is positioned so that it may restrict, or totally impede, the flow of compressed gas from compressed gas inlet 120 and the first channel 150, to the third set of channels 140, which supplies compressed gas to the lift portion 112 of active surface 110. Exhaust flow restrictor 352 is positioned at the exhaust 204 of pneumatically powered vacuum generator 200 such that its presence confines the exhausted compressed gas within bearing body 102. In this configuration, the lower pressure exhaust gas is also directed to the lift portion 112 of active surface 110, through the third set of channels 140. The absence of exhaust flow restrictor 352 allows the exhausted gases to directly escape bearing body 102. Low pressure flow restrictor 354 is positioned such that it may restrict or totally impede the lower pressure exhaust gas from the exhaust 204 of pneumatically powered vacuum generator 200 to the third set of channels 140.

As illustrated below, the position of the various gas flow restrictors may be modified to place the reconfigurable pneumatic bearing into various configurations. Additionally, the position of gas flow restrictors 356 and 354 may be precisely positioned to achieve the desired pneumatic pressure that is applied to the lift portion 112 of active surface 110. It should be noted that the above described flow restrictors are merely exemplary. One of skill in the art could envision alternate locations for the flow restrictors, or alternates types gas flow restriction devices such as pneumatic valves and throttles, which can be manually, mechanically, or computer-controlled. Exemplary configurations using the above described flow restrictors are illustrated more specifically in FIGS. 3A-F.

Figure 3B:
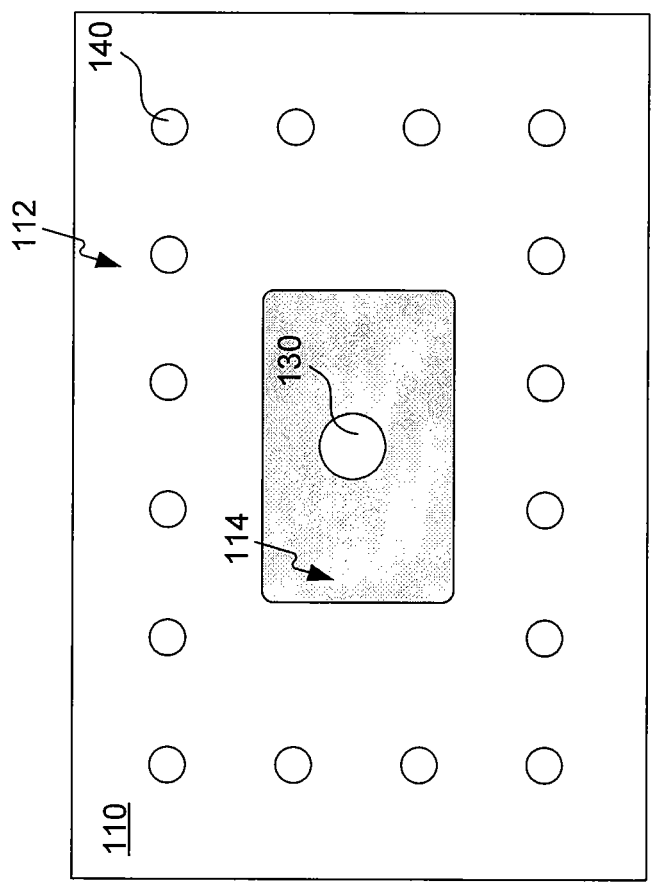

More specifically, FIGS. 3A-B illustrate a pneumatic bearing 300SP in a series-parallel configuration. In the series-parallel configuration, compressed gas is directed through compressed gas inlet 120, first channel 150, and to the inlet 202 of the pneumatically driven vacuum generator 200. Compressed gas is also directed through first channel 150 to the third set of channels 140, which directs compressed gas to the lift portion 112 of active surface 110. As illustrated, high pressure flow restrictor 356 impinges partially into first channel 150, downstream of the vacuum generator inlet 202, in order to precisely control the pneumatic pressure exerted by the compressed gas directly entering the third set of channels 140. In this fashion, one can control the pressure of the compressed gas that is supplied to the lift portion 112 of active surface 110. A typical compressed gas pressure range in the semiconductor lithography tool context could be 2-7 bar, for example.

In the series-parallel configuration of FIGS. 3A-B, the lower pressure compressed gas exiting the pneumatically powered vacuum generator 200 is also directed through the third set of channels 140 to the lift portion 112 of active surface 110. Such a configuration allows a greater portion of the compressed gas to be reused, which can be beneficial if more expensive gases are used. As described above in the context of FIG. 2, the integrated vacuum generator 200 uses compressed gas to draw a vacuum on second channel 130. A typical vacuum range in the semiconductor lithography tool context could be, for example, 22-25 inches of Mercury. Between the lift provided to lift portion 112 and the vacuum drawn on preload portion 114, a thin gas film is maintained over much of active surface 110. A typical thickness for a gas film on the active surface of a pneumatic bearing in the semiconductor lithography tool context could be, for example, on the order of fifteen microns or less.

Figure 3C:
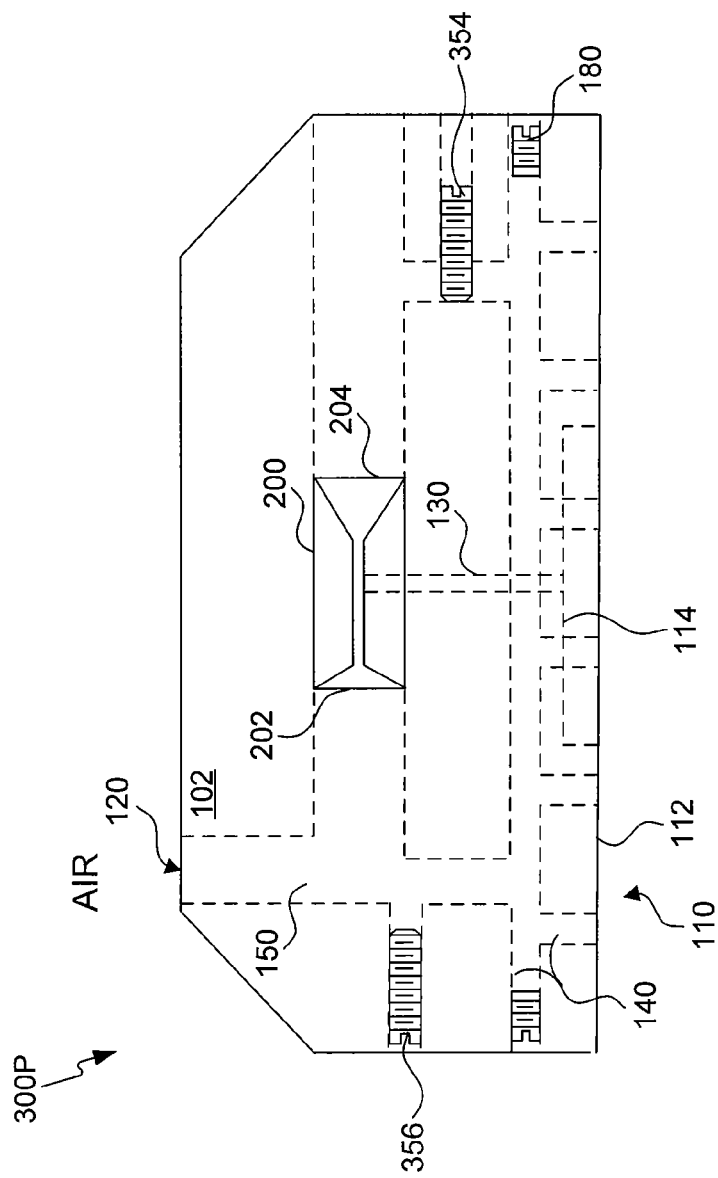
FIGS. 3C and 3D depict a generic embodiment of a pneumatic bearing with an integral vacuum generator, in a parallel configuration.
Figure 3D:
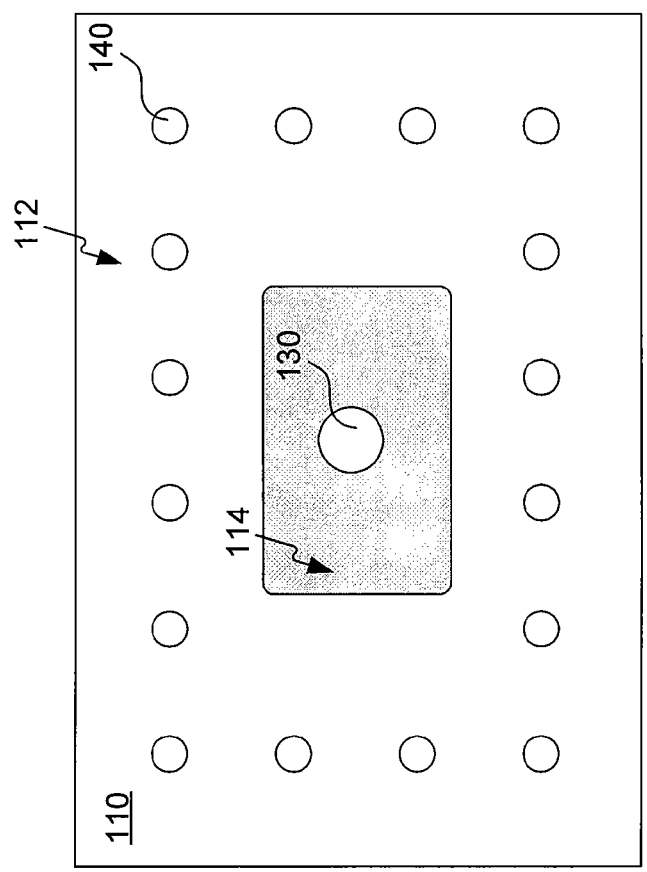

FIGS. 3C-D illustrate an alternate embodiment of a vacuum preloaded pneumatic bearing. Pneumatic bearing 300P is shown in a parallel configuration, where the compressed gas is supplied in parallel to the lift portion 112 of active surface 110, and to inlet 202 of integrated vacuum generator 200. As shown in FIG. 3C, flow restrictor 356 has been fully withdrawn into bearing body 102 such that it does not impede the flow of high pressure gas from compressed gas inlet 120 through to the lift portion 112 of active surface 110. Furthermore, low pressure flow restrictor 354 and exhaust flow restrictor 352 have been positioned to cause the exhaust gas from pneumatically powered vacuum generator 200 to be directed off the pneumatic bearing.

In an alternate embodiment (not shown), the exhausted gas may be directed to a motor or an electric circuit to provide a cooling effect. In yet another embodiment (not shown), the exhaust gas may be directed in a direction along the primary path of motion of the pneumatic bearing 300P, for the purpose of providing propulsion, thereby making such motion more efficient.

Figure 3E:
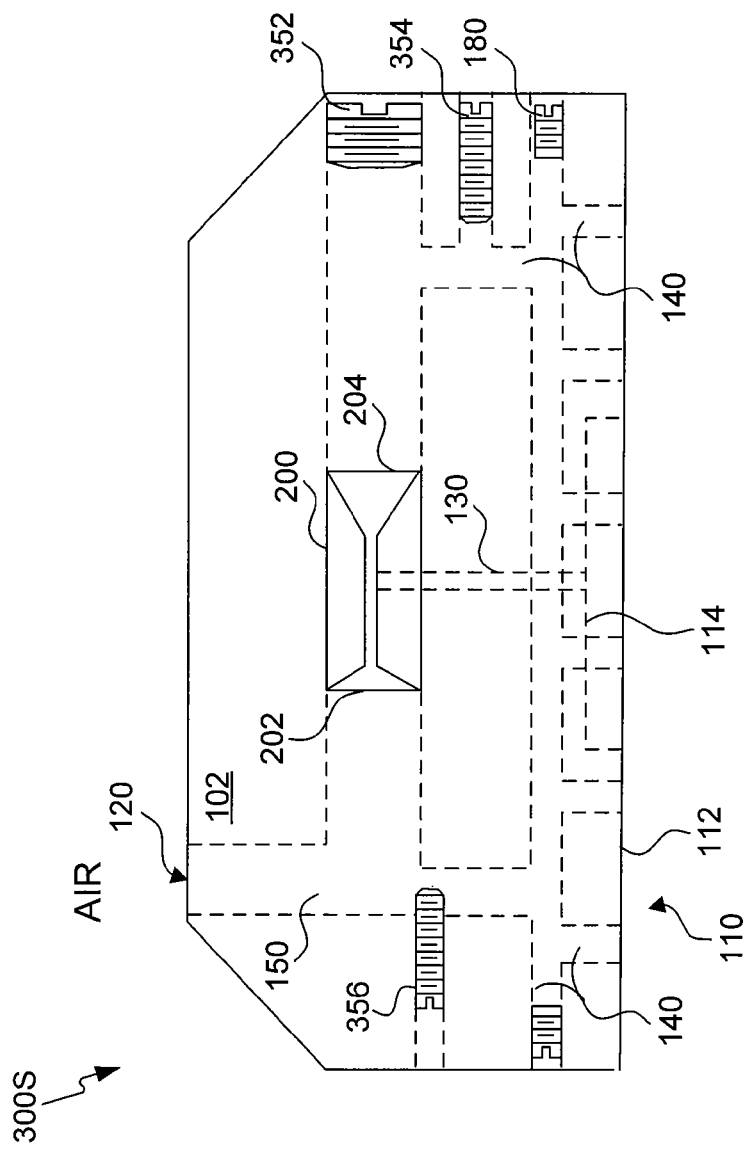
FIGS. 3E and 3F depict a generic embodiment of a pneumatic bearing with an integral vacuum generator, in a series configuration.
Figure 3F:
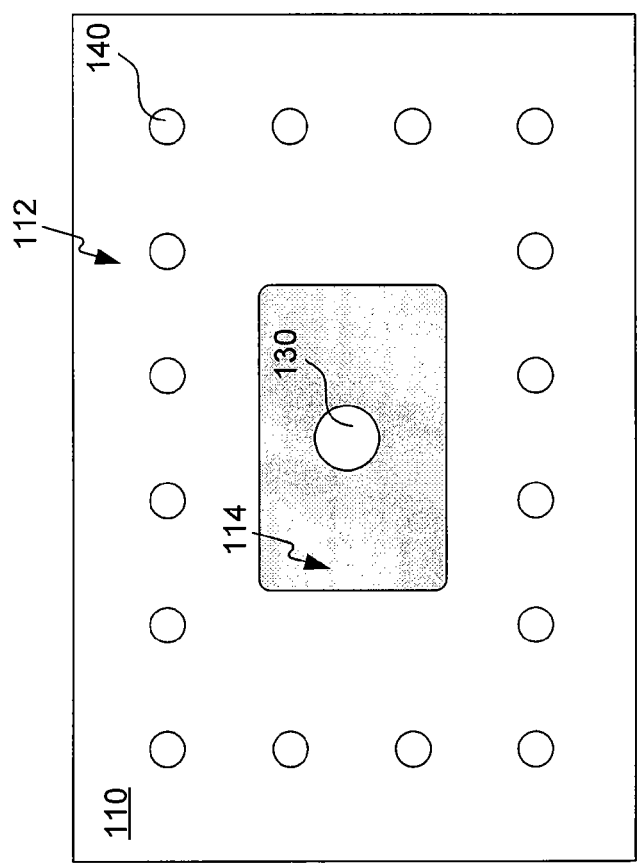

FIGS. 3E-F illustrate a pneumatic bearing 300S in a series configuration, where the compressed gas is first supplied to inlet 202 of integrated vacuum generator 200. The lower pressure compressed gas leaving the exhaust 204 of integral vacuum generator 200 is then supplied to the lift portion 112 of active surface 110, via the third set of channels 140. To accomplish this, high pressure flow restrictor 356 is positioned to entirely block compressed gas from being routed directly to lift portion 112 of active surface 110. At exhaust 204 of vacuum generator 200, exhaust flow restrictor 352 is positioned to confine the exhaust gas to bearing body 102, while low pressure flow restrictor 354 is positioned so as not to impede the flow of exhaust gas from exhaust 204 to the third set of channels 140, which supplies lift portion 112 of active surface 110.

Pneumatic Bearing with Internally Integrated Vacuum Generator

Figure 4A:
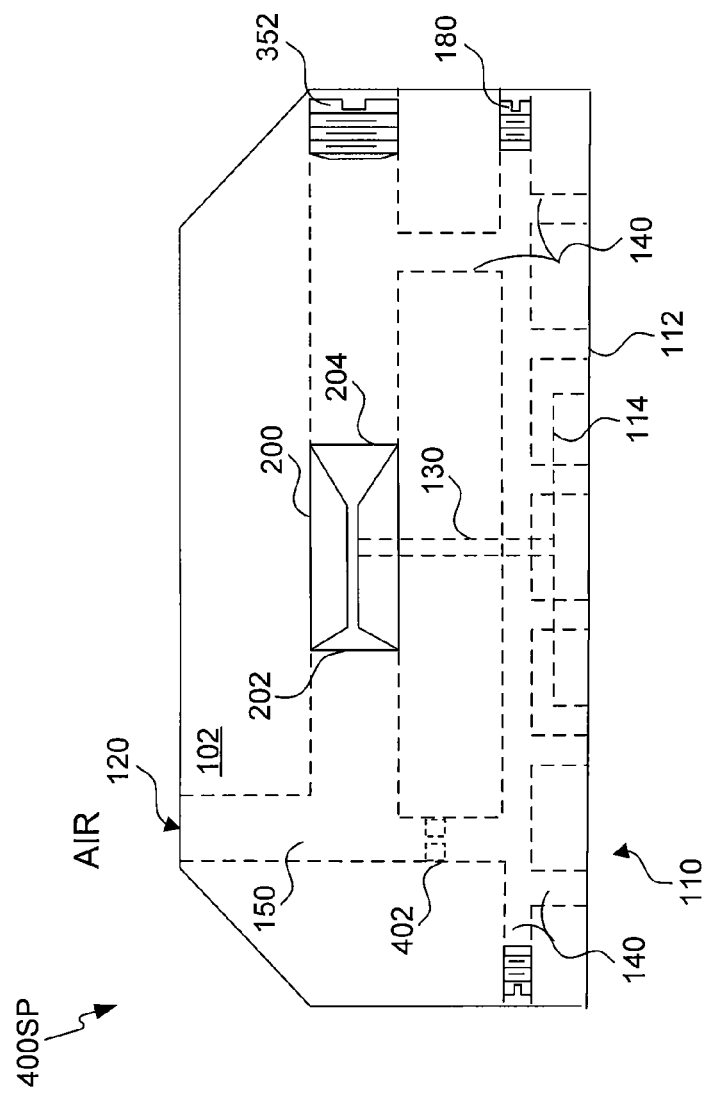
FIGS. 4A and 4B depict an embodiment of a pneumatic bearing with a vacuum generator disposed within the bearing body, in a series-parallel configuration.
Figure 4B:
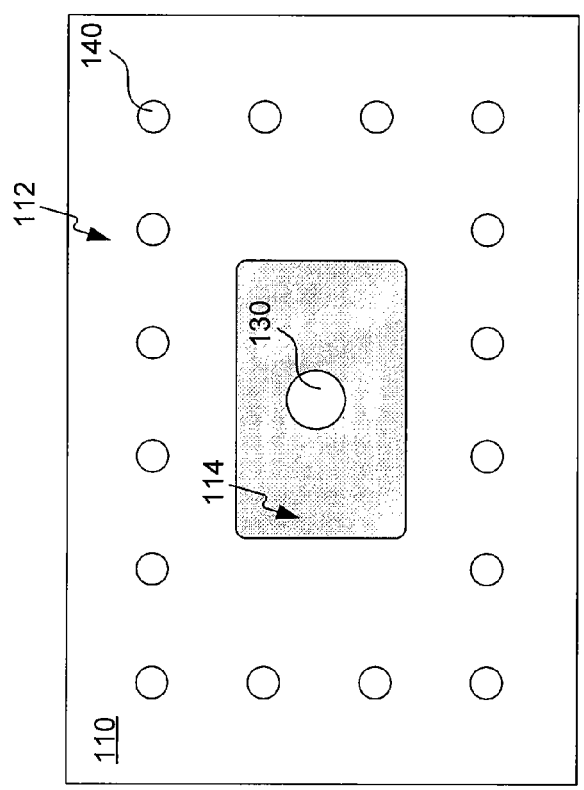

As described above with respect to the reconfigurable pneumatic bearing (300SP, 300P, and 300S), there are various configurations which may be implemented where the vacuum generator 200 is internally integrated into bearing body 102. FIGS. 4A-F illustrate similar configurations in non-reconfigurable form. For example, FIGS. 4A and 4B illustrate a non-reconfigurable series-parallel configuration 400SP. As with the embodiment described above with respect to 300SP, in pneumatic bearing 400SP compressed gas enters bearing body 102 through compressed gas inlet 120. The compressed gas is directed both to the inlet 202 of vacuum generator 200, and to the third set of channels 140, which supplies the lift portion 112 of active surface 110. The lower pressure exhaust gas from the pneumatically driven vacuum generator 200 is also directed to lift portion 112 of active surface 110 via third channel 140. As illustrated, a compressed gas flow restrictor 402 is disposed between first channel 150 and the third set of channels 140 so that the pressure of the gas supplying the lift portion 112 of active surface 110 is substantially the same whether it comes directly from first channel 150, or from the exhaust 204 of pneumatically driven vacuum generator 200.

Figure 4C:
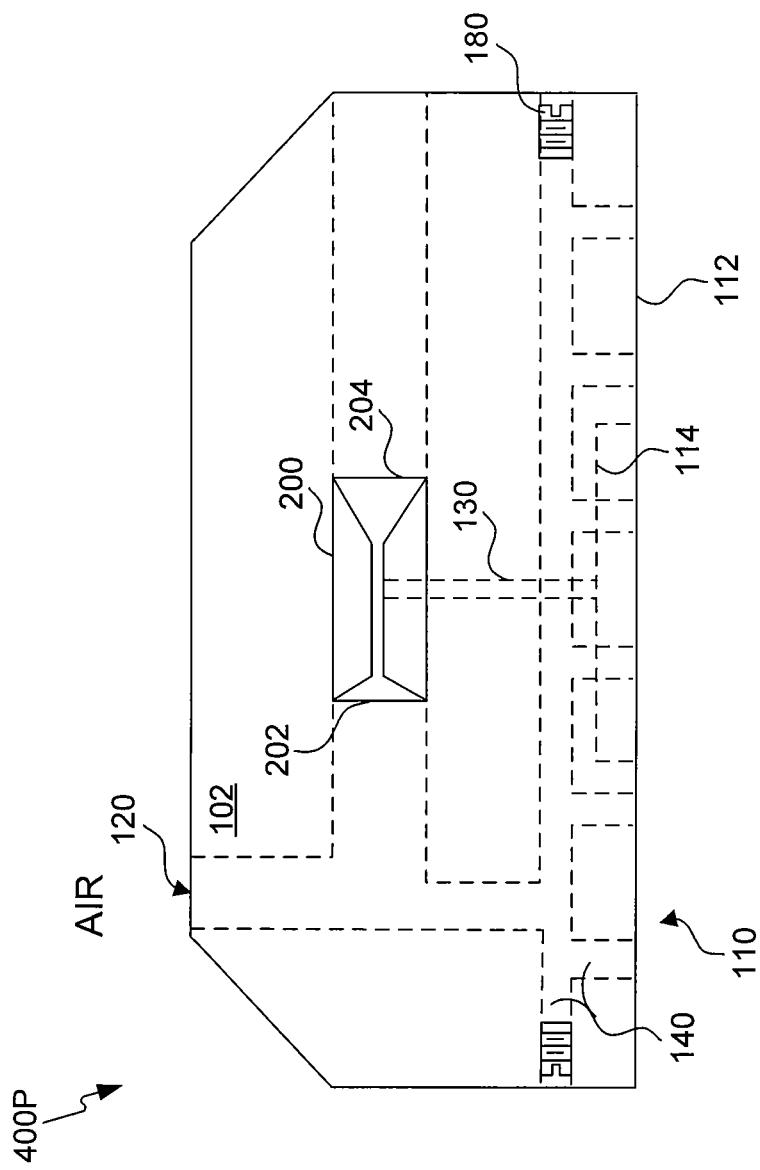
FIGS. 4C and 4D depict an embodiment of a pneumatic bearing with a vacuum generator disposed within the bearing body, in a parallel configuration.
Figure 4D:
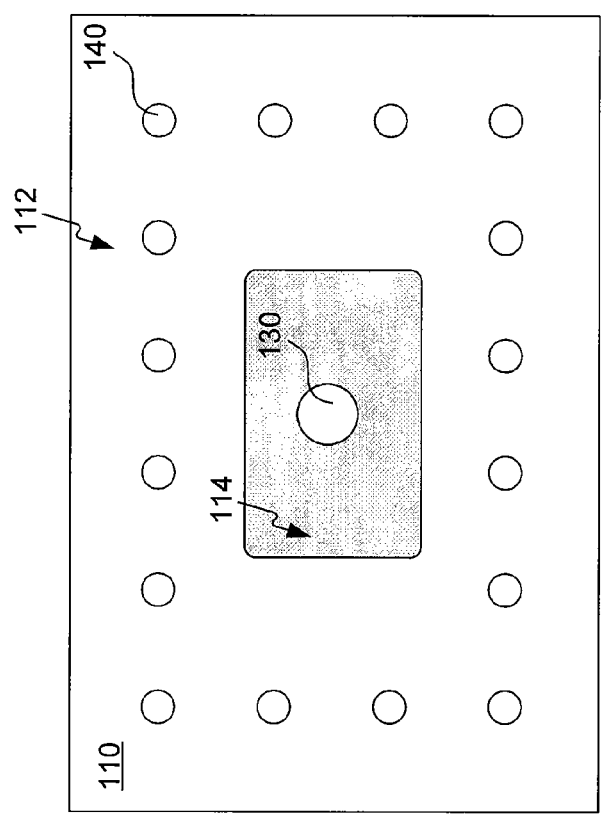
Figure 4E:
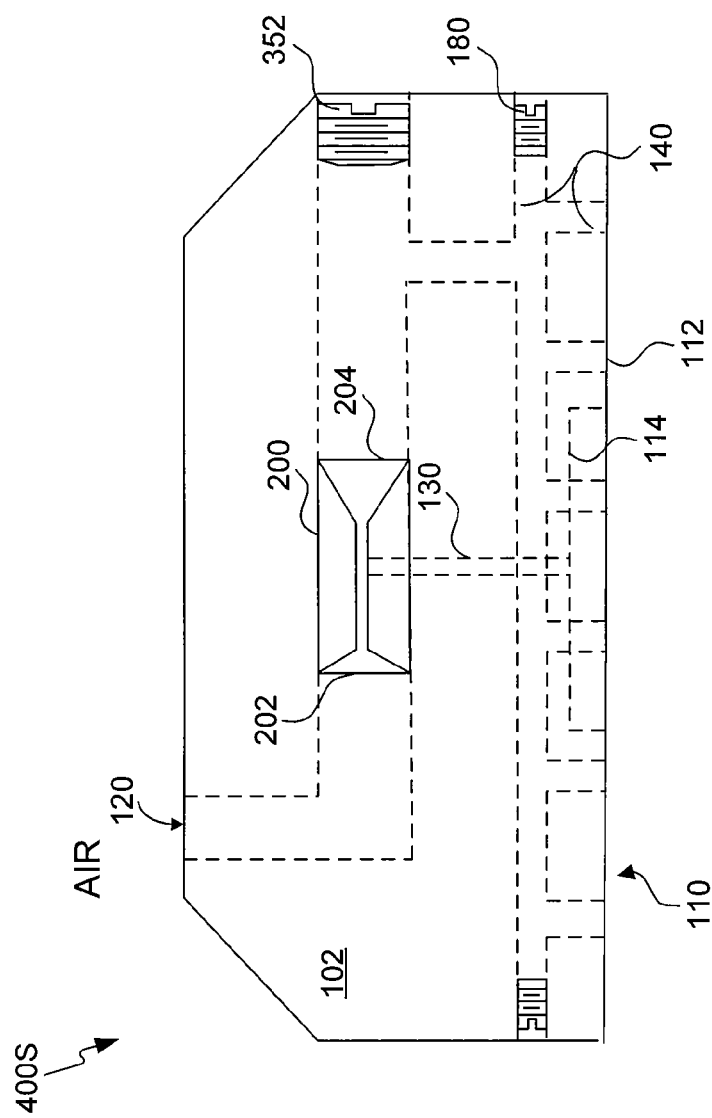
FIGS. 4E and 4F depict an embodiment of a pneumatic bearing with a vacuum generator disposed within the bearing body, in a series configuration.
Figure 4F:
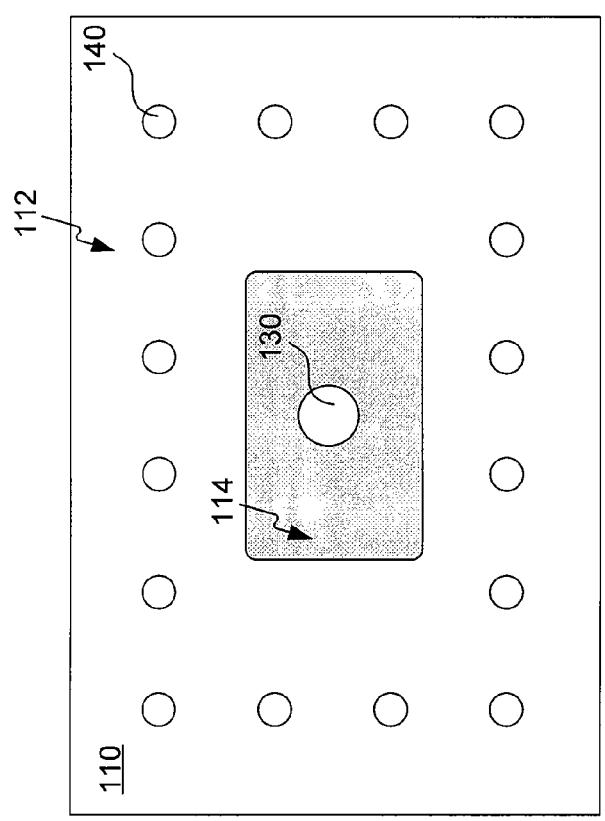
Figure 5A:
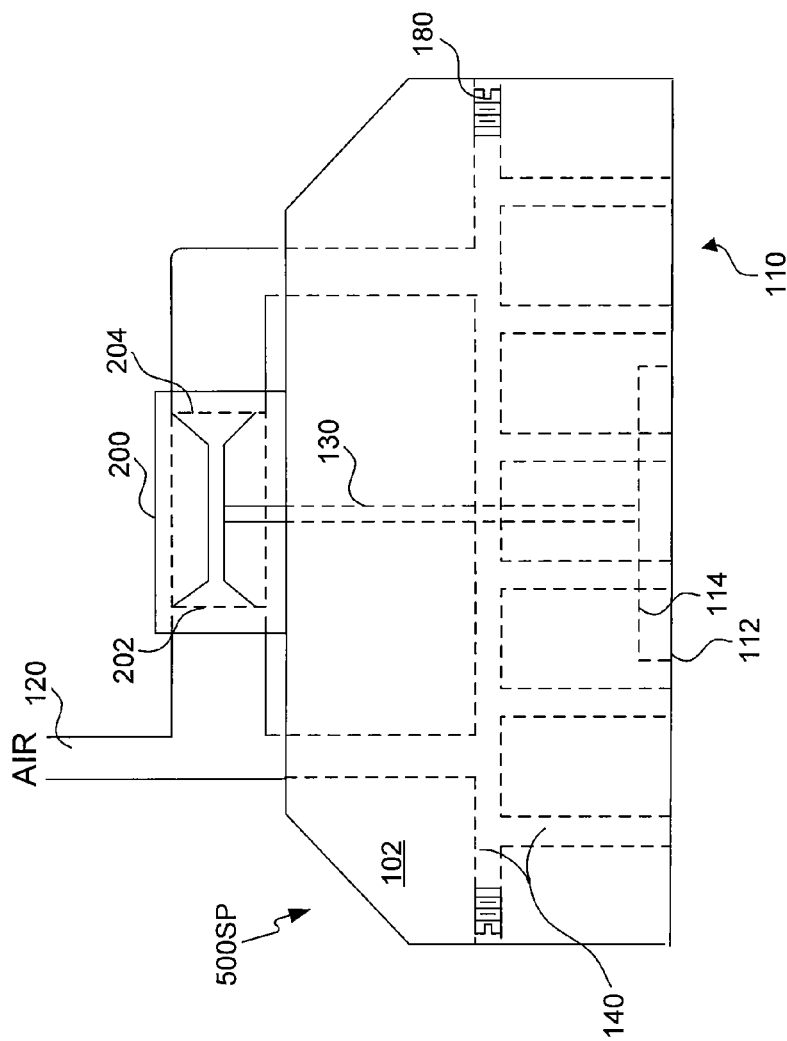
FIGS. 5A and 5B depict an embodiment of a pneumatic bearing with a vacuum generator disposed on the bearing body, in a series-parallel configuration.
Figure 5B:
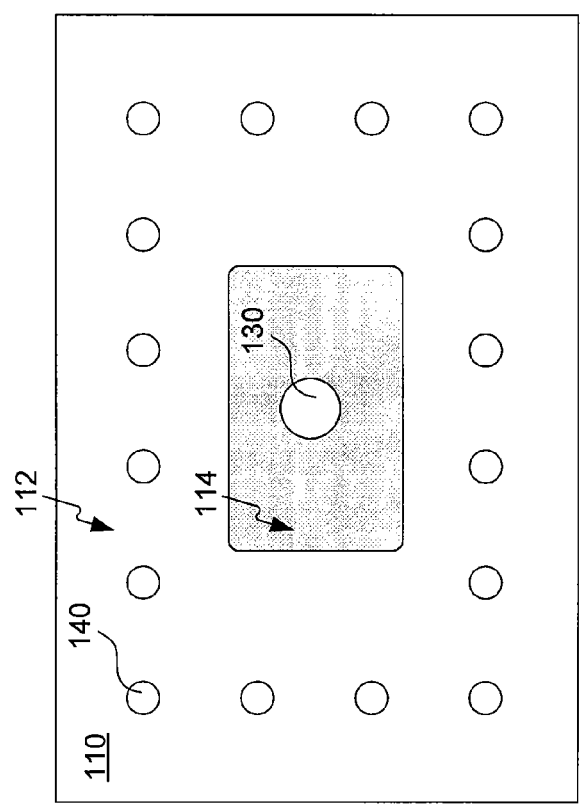
Figure 5C:
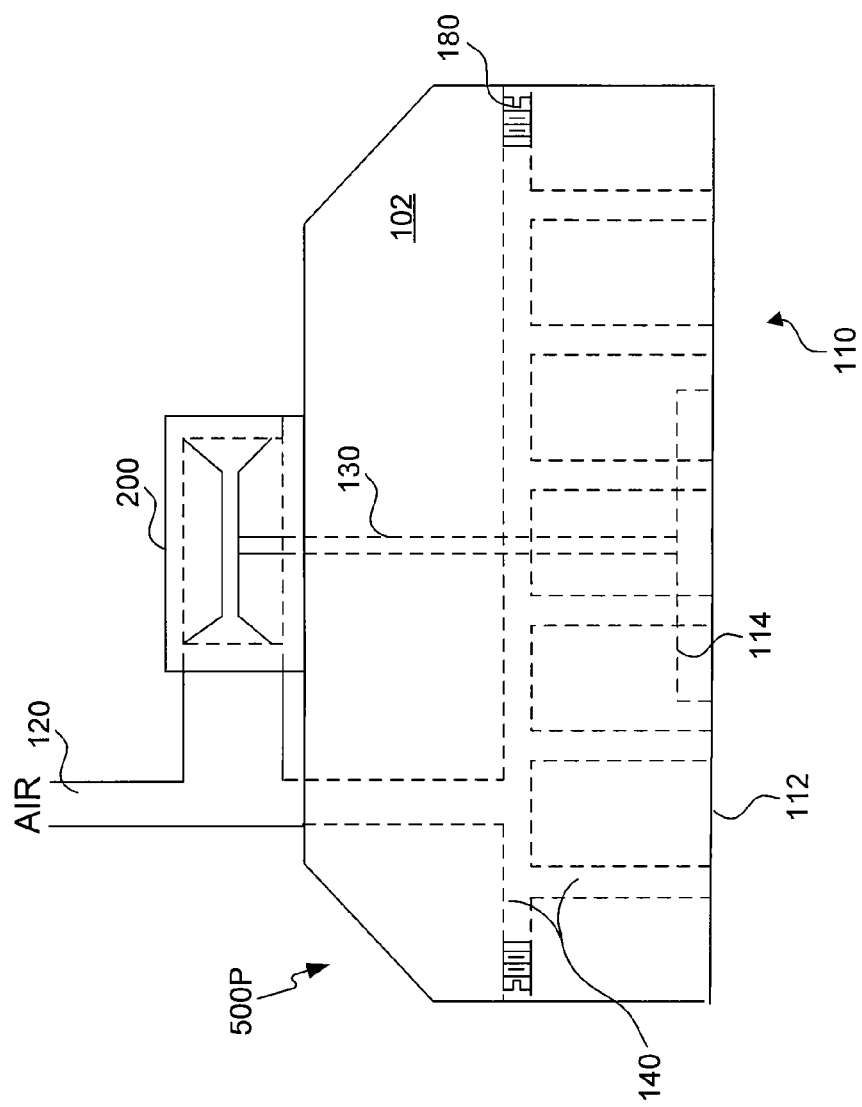
FIGS. 5C and 5D depict an embodiment of a pneumatic bearing with a vacuum generator disposed on the bearing body, in a parallel configuration.
Figure 5D:
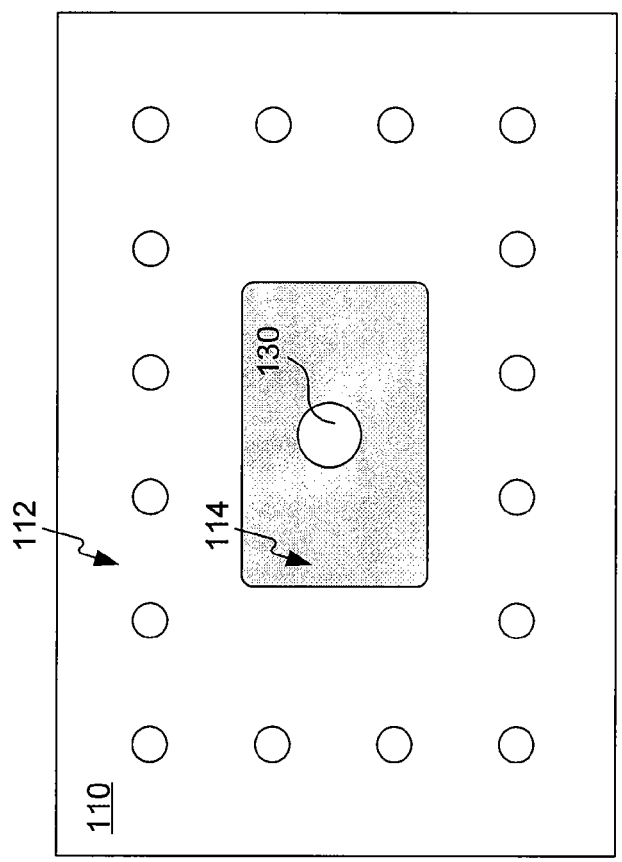
Figure 5E:
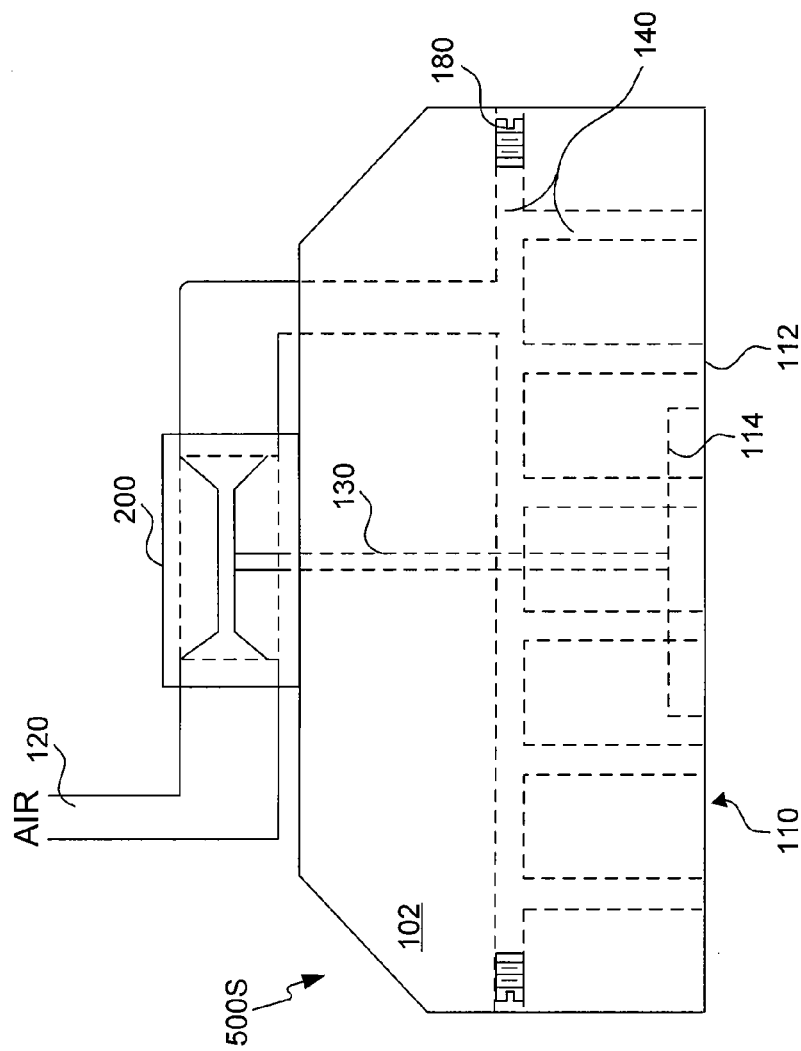
FIGS. 5E and 5F depict an embodiment of a pneumatic bearing with a vacuum generator disposed on the bearing body, in a series configuration.
Figure 5F:
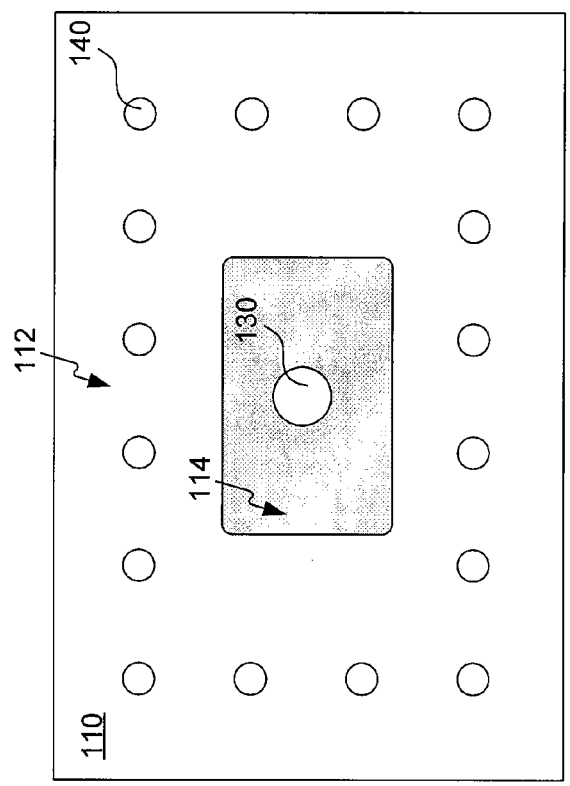

FIGS. 4C-D illustrate a non-reconfigurable parallel configuration of a pneumatic bearing 400P with a pneumatically driven internally integrated vacuum generator 200. The principle of operation is substantially similar to the pneumatic bearing 300P, illustrated in FIGS. 3C-D, and will not be repeated here. Similarly, FIGS. 4E-F illustrate a non-reconfigurable series configuration of pneumatic bearing 400S, whose principle of operation is substantially similar to pneumatic bearing of 300S, illustrated in FIGS. 3C-D.

Pneumatic Bearing with Externally Integrated Vacuum Generator

FIGS. 5A-F illustrate substantially the same configurations described above with respect to FIGS. 3A-F and 4A-F. In the embodiments shown in FIGS. 5A-F, however, pneumatically powered vacuum generator 200 is disposed on bearing body 102, as opposed to within bearing body 102. The illustrated embodiments function in a substantially similar way to the corresponding embodiments in FIGS. 3 and 4. An additional advantage of the structure illustrated in FIGS. 5A-F is that the vacuum pre-loaded pneumatic bearing as show in FIG. 1 could be modified to add an integrated vacuum generator 200.

Method for Supplying a Gas Film to a Pneumatic Bearing

Figure 6:
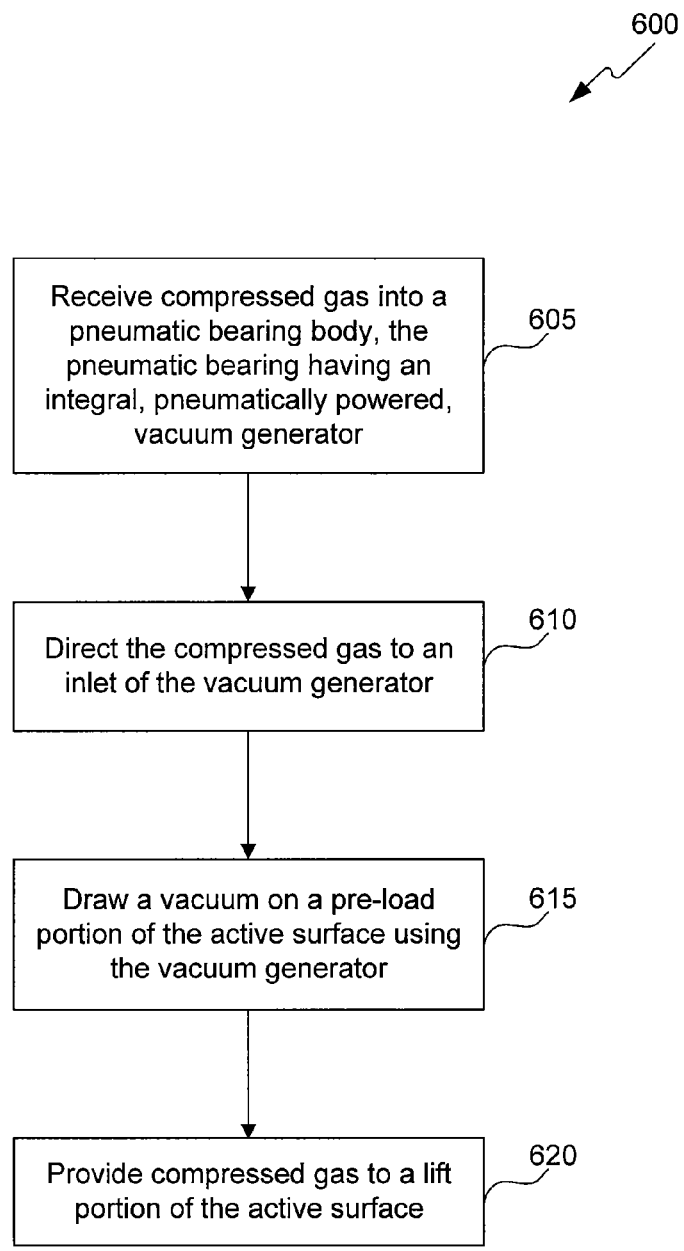
FIG. 6 illustrates a method of supplying a gas film to an active surface of a pneumatic bearing.

FIG. 6 illustrates an alternate embodiment of the invention. According to the method depicted FIG. 6, a gas film is supplied to the active surface of a pneumatic bearing. According to step 605, a compressed gas is received into a body of a pneumatic bearing. The pneumatic bearing has an integral, pneumatically powered, vacuum generator. As described above, the vacuum generator may be integrally disposed within the body of the pneumatic bearing, or may be integrally disposed on the body of the pneumatic bearing.

The compressed gas is directed to an inlet of the pneumatically powered vacuum generator in step 610. In an embodiment, the vacuum generator is a Venturi nozzle whose principle of operation is described above with respect to FIG. 2. The compressed gas could be air, or other gas, depending on the environment in which the pneumatic bearing is used.

In step 615, the compressed gas is then used to draw a vacuum on a pre-load portion of the active surface using the pneumatically powered vacuum generator. Pre-loading is used to provide stiffness to the pneumatic bearing. As described above, stiffness is an important consideration when pneumatic bearings are used in the context of semiconductor lithography tools.

Finally, the compressed gas is provided to a lift portion of the active surface. As described above, the manner in which the compressed gas is supplied to the lift portion is determined by the particular configuration of the gas channels. If the compressed gas is supplied directly to both the inlet of the vacuum generator and to the lift portion of the active surface, then the pneumatic bearing is in a parallel configuration. If the lower pressure compressed gas is supplied to the lift portion of the active surface from the exhaust of the vacuum generator, then the pneumatic bearing is in a series configuration. Finally, if the lift portion of the active surface receives compressed gas both directly from the compressed gas source, and from the vacuum generator exhaust, then the pneumatic bearing is in a series-parallel configuration. Choice of a particular configuration could depend on the amount of stiffness required in the pneumatic bearing, the type of gas used to form the lubricating gas film on the active surface, or other particular operating characteristics.

Various embodiments of the present invention have been described above. It should be understood that these embodiments have been presented by way of example only, and not limitation. It will be understood by those skilled in the relevant art that various changes in form and details of the embodiments described above may be made without departing from the spirit and scope of the present invention as defined in the claims. For instance, the precise disposition of the compressed gas channels, and the location and positioning of the flow restrictors are exemplary and should not be construed as limiting beyond the features recited in the appended claims. The position of the integrated vacuum generator and the layout of active surface are also exemplary, and not intended to be limiting. In summary, the breadth and scope of the present invention should not be limited by any of the above-described exemplary embodiments, but should be defined only in accordance with the following claims and their equivalents.

What is claimed is:

1. A pneumatic bearing for supporting a payload, comprising:
   a bearing body having an active surface divided into a lift portion and a pre-load portion; and
   a plurality of gas distribution channels in the bearing body, wherein a first channel receives a compressed gas, a second channel supplies a vacuum to the pre-load portion of the active surface, and a third channel supplies a positive pressure gas to the lift portion of the active surface;
   wherein the bearing body has an integral, pneumatically powered, vacuum generator having an inlet coupled to the first channel, a vacuum aperture coupled to the second channel, and an exhaust.

2. The pneumatic bearing of claim 1, wherein the third channel is coupled to the inlet of the vacuum generator.

3. The pneumatic bearing of claim 1, wherein the third channel is coupled to the exhaust of the vacuum generator.

4. The pneumatic bearing of claim 1, wherein the third channel is coupled to both the inlet and the exhaust of the vacuum generator.

5. The pneumatic bearing of claim 1, wherein the pneumatically powered vacuum generator is disposed on the bearing body.

6. The pneumatic bearing of claim 1, wherein the pneumatically powered vacuum generator is disposed within the bearing body.

7. The pneumatic bearing of claim 1, wherein the exhaust of the vacuum generator is used to cool a selected portion of the pneumatic bearing.

8. The pneumatic bearing of claim 1, wherein the exhaust of the vacuum generator is directed along a selected axis of motion, thereby facilitating motion along the selected axis of motion.

9. The pneumatic bearing of claim 1, further comprising:
   a high pressure gas flow restrictor between the first and third channels;
   a low pressure gas flow restrictor between the vacuum generator exhaust and the third channel; and
   an exhaust gas flow restrictor between the vacuum generator exhaust and the local atmosphere,
   wherein the flow restrictors are positioned to supply the compressed gas to the lift portion of the active surface in a configuration selected from the group comprising: (i) the lift portion of the active surface supplied in parallel with the vacuum generator, (ii) the lift portion of the active surface supplied in series from the exhaust of the vacuum generator, and (iii) the lift portion of the active surface supplied both in series from the exhaust of the vacuum generator and in parallel with the vacuum generator.

10. The pneumatic bearing of claim 1, wherein the lift portion of the active surface is formed from a solid material having a discrete number of apertures through which the compressed gas flows.

11. The pneumatic bearing of claim 1, wherein the lift portion of the active surface is formed from a porous material having a continuum of evenly distributed apertures through which the compressed gas flows.

12. A method for supplying a gas film to an active surface of a pneumatic bearing, comprising:
   receiving compressed gas into a body of the pneumatic bearing, the pneumatic bearing having an integral, pneumatically powered, vacuum generator;
   directing the compressed gas to an inlet of the vacuum generator;
   drawing a vacuum on a pre-load portion of the active surface using the vacuum generator; and
   providing compressed gas to a lift portion of the active surface.

13. The method of claim 12, wherein the providing step further comprises directing the compressed gas directly to the lift portion of the active surface.

14. The method of claim 12, wherein the providing step further comprises directing compressed gas from an exhaust of the vacuum generator to the lift portion of the active surface.

15. The method of claim 12, wherein the providing step further comprises directing the compressed gas (i) directly to the lift portion of the active surface, and (ii) from an exhaust of the vacuum generator to the lift portion of the active surface.

16. The method of claim 12, wherein the vacuum generator is disposed on the pneumatic bearing.

17. The method of claim 12, wherein the vacuum generator is disposed within the pneumatic bearing.

18. The method of claim 12, wherein the exhaust of the vacuum generator is used to cool a selected portion of the pneumatic bearing.

19. The method of claim 12, wherein the exhaust of the vacuum generator is directed along a selected axis of motion, thereby facilitating motion along the selected axis of motion.

* * * * *